United States Patent [19]

Hsiung

[11] 4,055,699
[45] Oct. 25, 1977

[54] COLD INSULATING INSOLE

[75] Inventor: Du Yung Hsiung, Park Forest, Ill.

[73] Assignee: Scholl, Inc., Chicago, Ill.

[21] Appl. No.: 746,891

[22] Filed: Dec. 2, 1976

[51] Int. Cl.$^2$ ............................................. B32B 3/26
[52] U.S. Cl. ...................................... 428/311; 428/80;
   428/213; 428/313; 428/315; 36/44
[58] Field of Search ................ 36/44; 428/310, 311,
   428/315, 313, 158, 159, 160, 80, 213, 215

[56] References Cited

U.S. PATENT DOCUMENTS

| | | | |
|---|---|---|---|
| 2,641,068 | 6/1953 | Thompson | 36/44 |
| 2,917,844 | 12/1959 | Scholl | 36/44 |
| 3,152,950 | 10/1964 | Palmquist et al. | 428/915 |
| 3,328,225 | 6/1967 | Urbanic et al. | 428/315 |
| 3,736,109 | 2/1956 | Scholl | 36/44 |
| 3,741,844 | 6/1973 | Schwartz | 428/310 |
| 3,812,225 | 5/1974 | Hosoda et al. | 264/54 |
| 3,833,259 | 9/1974 | Pershing | 428/310 |
| 3,954,537 | 5/1976 | Alfter et al. | 428/310 |

Primary Examiner—William J. Van Balen
Attorney, Agent, or Firm—Hill, Gross, Simpson, Van Santen, Steadman, Chiara & Simpson

[57] ABSTRACT

A multi-layer insole for disposition in an article of footwear to insulate the foot from the cold developed in the sole and sock lining, if any, of the footwear from walking on a cold surface, the insole being sufficiently thin to fit in the footwear satisfactorily to the user without requiring any extra size of shoe, boot or the like and being highly effective in maintaining the foot warm in cold weather.

7 Claims, 4 Drawing Figures

COLD INSULATING INSOLE

BRIEF SUMMARY OF THE INVENTION

Heretofore, various types of foot warming insoles have been developed. These consisted among others as one-fourth inch hair felt; cork base with fleece on top; cork with felt stitched to same; extra heavy cork insole with flannel top; and black oil cloth base; soft felt with leatherette top; extra thick latex foam; and wool fleece with latex foam bottom. All of these operate with more or less or, what one might call average efficiency. They comprise from one layer to three layers per insole, and most, if not all of them, are necessarily too thick by virtue of the insulation relied upon for comfortable insertion in an article of footwear such as an ordinary shoe commonly worn anytime of year and in both warm and cold climates. Many of them would require an extra size of shoe to comfortably accommodate the insole to avoid a feeling of squeezing the foot which would lessen the effect of the insole keeping the foot warm.

The instant invention or discovery contemplates an insole of multi-layers that is highly efficient in insulating the foot against the cold developed in the sole or sock lining, if any, in the article of footwear being worn. In the case of a shoe ordinarily worn by the user, the insole is so thin that it may readily and easily be placed in that shoe and the foot of the wearer will not feel an uncomfortable squeezing sensation.

The preferred form of the invention or discovery comprises an insole having four layers, including from top to bottom, a top layer of soft fabric for comfortable contact with the plantar surface of the foot or sock of the wearer; a second layer of a thermoplastic foam cushion material, preferably open celled; a third layer which is more effective than any other layer in insulating the foot against cold and which may be as thin as 0.046 inch; and a fourth layer that is an aluminized polymeric material of paper thinness, preferably embossed to provide a pebble-grain finish.

While that order of layers may be preferred, it is not essential. The layer of aluminized polymeric material may be disposed between any other adjacent layers so that it may be second, third or fourth from the top layer, since it is a moisture barrier to the foot to eliminate any cold damp feeling in the foot, and provides some cold insulation aid. If it is any but the bottom layer it need not have a pebble-grain finish. All of the layers are of thermoplastic heat sealable material so that they may be heat welded together into a uniform composite sheet highly resistive to any delamination. The entire insole may be as thin as 0.125 to 0.156 inch when not under weight and, of course, less in thickness when under weight. The thickness may, of course, be increased depending upon the severity of low temperature if the wearer intends to spend a lot of time in such low temperature, and for added cushioning.

Further, the insole is economical in construction and possesses the advantages of excellent warmth, durability, flexibility, and provides an excellent feeling to the foot of the user.

Many other advantages, features and additional objects of the present invention will become manifest to those versed in the art upon making reference to the description and the accompanying sheets of drawings in which a preferred structural embodiment incorporating the principles of the present invention is shown by way of illustrative examples.

DETAILED DESCRIPTION

Figure 2:
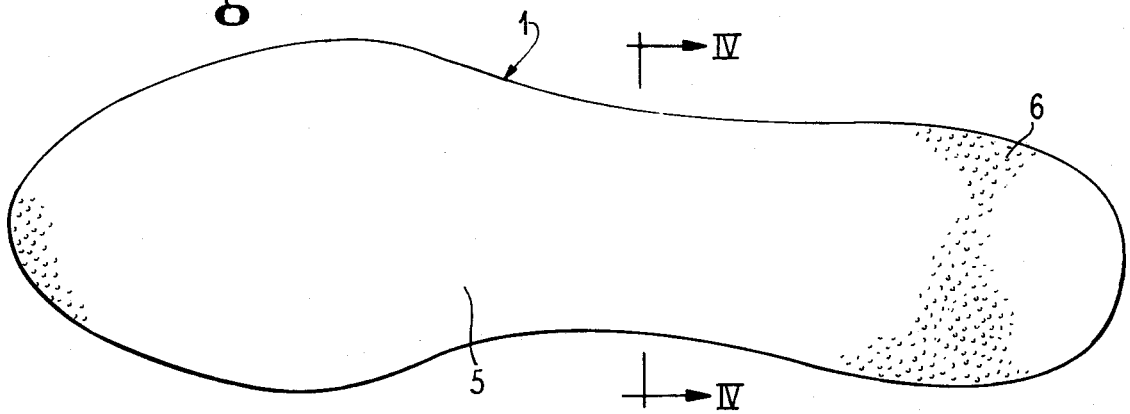
FIG. 2 is a bottom plan view of a completed insole.
Figure 3:
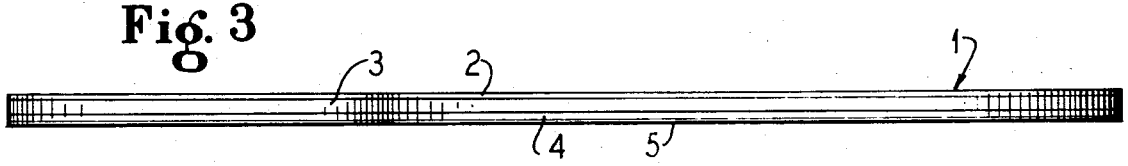
FIG. 3 is a side elevational view of the insole right side up and ready for use.
Figure 4:
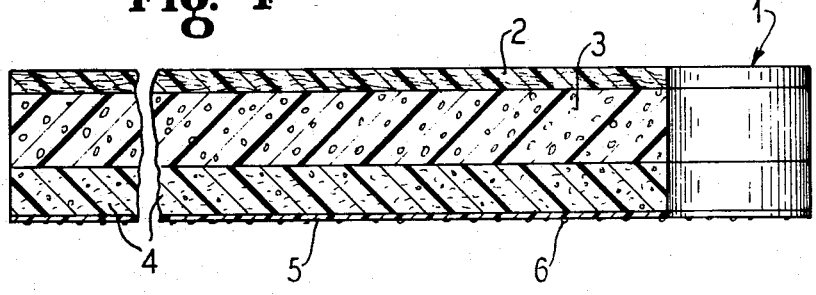
FIG. 4 is a sectional view taken substantially as indicated by the line IV—IV of FIG. 2 with the insole in upright position for use, the figure being highly exaggerated for clarity.

The preferred embodiment of the instant invention is best seen in FIGS. 2, 3 and 4. With reference to FIG. 4 particularly, it will be seen that the insole, generally indicated by numeral 1, comprises four layers of material, namely a thin top layer 2 of soft fabric, nylon felt being highly satisfactory; beneath the layer 2 is a layer 3 of thermoplastic foam cushioning material, which is the thickest layer of all and may be polyurethane foam or polyurethane foam impregnated with polyvinyl chloride foam to improve its heat sealing characteristic; below the layer 3 is a thinner layer 4 which is a cross-linked polyolefin, preferably of a cross-linked high density polyethylene; and a bottom layer 5 which is a film of aluminum coated polymeric material, the kind sold under the tradename "MYLAR" (polyethylene terephthalate) being one usable type. This bottom layer is embossed to provide a pebble-grain effect, as indicated at 6.

Since all of the layers are of thermoplastic heat sealable material, they may be heat welded uniformly throughout, thus preventing any delamination even after long usage.

Each of the four layers of the composite insole performs different functions. The top layer 2, preferably of nylon felt as stated above, gives a warm, pleasant feel to the sole of the foot of the user and at the same time prevents slippage of the user's foot on the insole during walking when the insole is under pressure. The open-celled foam layer 3 which is thicker than any other layer cushions the foot and would give relief to the user in the event the user had plantar epidermal callosities, and in time, might cause such callosities to dissipate. The third layer 4 of a cross-linked polyolefin, preferably cross-linked polyethylene, is dense and sufficiently rigid to permit easy placement of the insole in a shoe or other article of footwear, but not so rigid as to interfere with the necessary flexibility in walking. The preferred cross-linked polyethylene has a density in the range of 2 pounds per cubic foot to 6 pounds per cubic foot and is resistant to creep or cold flow at elevated temperatures, and maintains its toughness to low negative temperatures. More important is the fact that this cross-linked polyethylene layer need be only approximately 0.046 inch in thickness and yet tests have shown that it is the most effective of the four layers in insulating the foot against cold. The bottom layer 5, preferably aluminized "MYLAR" because of its toughness and durability is merely a thin film but preferably embossed to provide the pebble-grain effect as indicated by numeral 6. This layer 5 permits the insole to be easily slipped into a shoe or the like, but when the nodules of the embossing 6 are under pressure aid materially in preventing the insole from slipping within the article of footwear or buckling.

As stated above, this layer 5 is a moisture barrier to the foot to eliminate any cold damp feeling in the foot, and can be located between layers 2 and 3, or between layers 3 and 4, and need not have a pebble-grain finish if so located. Thus, the insole may include four layers with the lower three layers superposed in any desired order.

The composite insole in its entirety need only be in the range of 0.125 – 0.156 inch in thickness to satisfactorily insulate the foot against cold in the Northern States of the U.S., and also will fit nicely in a shoe or the like without any objectionable squeezing action to the foot of the user and does not necessitate any increased size of the shoe to accommodate the insole. Of course, the insole will be not that thick when carrying a part of the body weight during walking due to the compression of the layer 3. However, in far northern climates where the temperature may remain below 0° F. for relatively long periods of time, it may be desirable to utilize a thicker composite insole paricularly with regard to the most effective insulating layer 4.

If more cushioning is desired the open-celled layer 3 could be thickened and the insole brought to 0.250 inch in thickness, since it would not be that thick under foot pressure, and depending upon circumstances.

Another feature of the composite insole resides in the fact that the open-celled foam layer 3 is above the most effective insulating layer 4 and being open-celled would tend tp pump air as body pressure is alternately applied and removed during walking, and the pumped air circulating around the sides of the foot within the shoe would be warm air thus adding somewhat to the warmth of the foot.

While the other layers may each contribute an amount of insulting value to the whole insole, the most effective layer is the cross-linked polyethylene layer 4.

Figure 1:
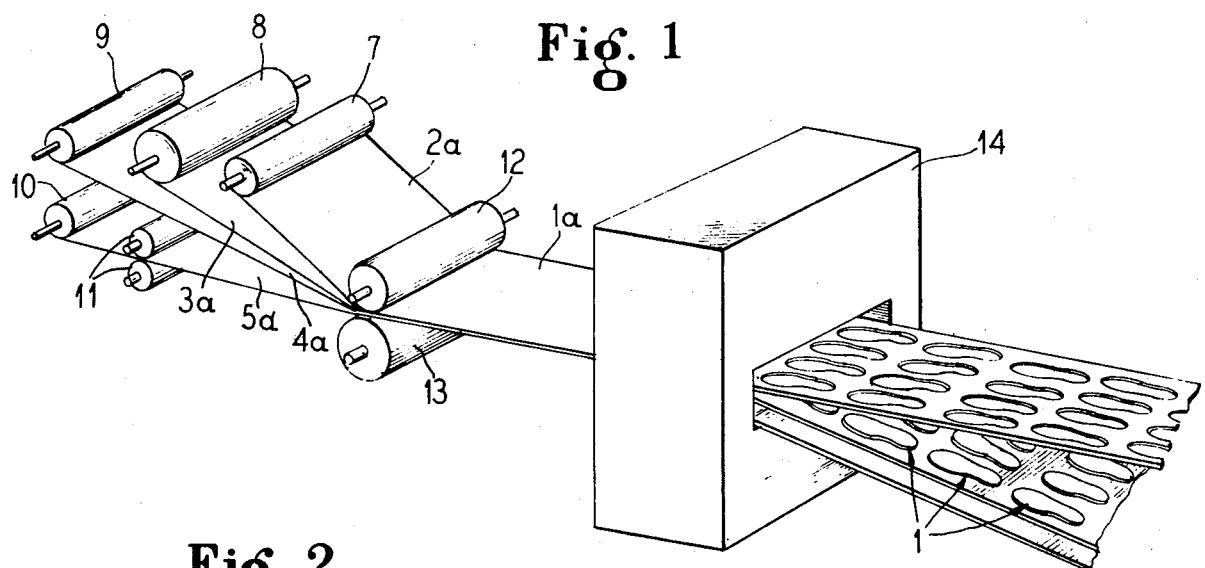
FIG. 1 is a diagrammatic view illustrating one satisfactory method of making the instant invention.

In order to render this specification complete, I have diagrammatically shown a method of producing the insole 1 in FIG. 1, which as presently known is the preferred method. The composite four-ply material of the insole 1 is made in a relatively wide ribbon, the top layer of material 2a being removed in a known manner from a supply roll 7. Material for the second layer 3a is removed from the supply roll 8 beneath the layer 2a. The material for the third layer 4a is removed from the supply roll 9 beneath the material 3a; and the material 5a for the layer 5 is removed from a supply roll 10 beneath the material 4a, if layer 5 is to be the bottom layer. After leaving the roller 10 material 5a passes between a pair of embossing rolls 11 to provide the desired pebble-grain effect in the layer 5 of the insole if it is the bottom layer, or that layer may first be embossed with the pebble-grain effect prior to being wound into the supply roll 10. Of course, if a different order of superposing the lower three layers is dsired, the supply rolls will be arranged accordingly, and the embossing rolls 11 may be omitted if the layer 5 is not to be the bottom layer. All four layers pass in proper position between a pair of pressure rolls 12 and 13, one or both which may be heated sufficiently to heat-weld the layers together into a composite ribbon 1a. At that time and in that location or later in another location the composite ribbon 1a may be passed through a conventional die cutting machine diagrammatically shown at 14, this machine being available on the open market. The cutting machine 14 then severs a plurality of insoles 1 from the composite sheet 1a in a manner to provide the least amount of wastage. From the foregoing it will be apparent that I have provided a highly effective foot warming insole providing a good feeling of warmth and dryness to the foot, and which is highly durable and has excellent flexibility, and further is easily inserted into an article of footwear.

I claim:

1. A laminated multi-layer insole for disposition in an article of footwear to insulate the foot from the cold developed in the sole of the footwear from walking or standing on a cold surface which comprises four superimposed layers comprising from top to bottom, a thin soft fabric layer laminated to the top of an open cell foam layer, a dense cross-linked polyolefin layer laminated to the bottom of said foam layer, and an aluminum coated moisture barrier layer of polymeric material laminated to the bottom of said cross-linked polyolefin layer, and said polymeric material layer having the aluminum coating on the exposed bottom face of the insole to engage the footwear.

2. An insole for disposition in an article of footwear to insulate the foot from the cold developed in the sole of the footwear from walking or standing on a cold surface which comprises a plurality of bonded together laminations composed of a top fabric layer, a layer of thermoplastic foam cushioning material, a layer of cross-linked high density polyethylene and a layer of aluminum coated polymeric material being selectively positioned between the fabric layer and the foam layer or between the foam layer and the polyethylene layer or forming the exposed bottom layer, and said bonded together laminations being joined by heat welded bonds.

3. The insole of claim 1 wherein the polyolefin layer is a high density cross-linked polyethylene layer and the aluminum coated polymeric material layer is a sheet of polyethylene terephthalate coated at least on one face with aluminum.

4. The insole of claim 2 wherein the aluminum coated polymeric material layer is a sheet of polyethylene terephthalate coated with aluminum and embossed to provide a pebble-grain effect on the aluminum coated surface.

5. The insole of claim 1 wherein the foam layer is selected from the class consisting of polyurethane and polyvinyl-chloride foam.

6. The insole of claim 1 in which the cross-linked polyolefin layer has a density in the range of about 2 pounds per cubic foot to 6 pounds per cubic foot and is resistant to creep and cold flow at elevated temperatures.

7. The insole of claim 1 having an overall thickness in the range of 0.125 to 0.250 inches.

* * * * *